United States Patent
Nissato

(10) Patent No.: US 8,965,614 B2
(45) Date of Patent: Feb. 24, 2015

(54) HYBRID VEHICLE

(75) Inventor: Yukihiro Nissato, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/641,430

(22) PCT Filed: Mar. 23, 2011

(86) PCT No.: PCT/JP2011/057930
§ 371 (c)(1),
(2), (4) Date: Oct. 15, 2012

(87) PCT Pub. No.: WO2011/129196
PCT Pub. Date: Oct. 20, 2011

(65) Prior Publication Data
US 2013/0030638 A1 Jan. 31, 2013

(30) Foreign Application Priority Data
Apr. 15, 2010 (JP) ................. 2010-094391

(51) Int. Cl.
| | |
|---|---|
| *B60W 20/00* | (2006.01) |
| *B60L 11/18* | (2006.01) |
| *B60K 6/442* | (2007.10) |
| *B60L 11/12* | (2006.01) |
| *B60L 11/14* | (2006.01) |
| *B60W 10/02* | (2006.01) |
| *B60W 10/08* | (2006.01) |

(52) U.S. Cl.
CPC .............. *B60L 11/1861* (2013.01); *B60K 6/442* (2013.01); *B60L 11/123* (2013.01); *B60L 11/14* (2013.01); *B60W 10/02* (2013.01); *B60W 10/08* (2013.01);

(Continued)

(58) Field of Classification Search
CPC ..... B60W 20/00; B60W 10/08; B60W 10/06; Y02T 10/6286; B60K 6/445
USPC ............... 701/1, 22, 104, 108, 110, 112, 113; 477/3, 187, 5, 6, 8
See application file for complete search history.

(56) References Cited

U.S. PATENT DOCUMENTS

| | | |
|---|---|---|
| 6,886,648 B1 | 5/2005 | Hata et al. |
| 8,775,043 B2 | 7/2014 | Imaseki et al. |

(Continued)

FOREIGN PATENT DOCUMENTS

| | | |
|---|---|---|
| CN | 101445044 B | 3/2012 |
| JP | 4-297330 A | 10/1992 |

(Continued)

OTHER PUBLICATIONS

International Search Report issued in PCT/JP2011/057930 mailed Jun. 14, 2011.

*Primary Examiner* — Helal A Algahaim
*Assistant Examiner* — Jelani Smith
(74) *Attorney, Agent, or Firm* — Birch, Stewart, Kolasch & Birch, LLP

(57) ABSTRACT

A hybrid vehicle is provided in which after a determination is made as to whether the remaining capacity is higher than a first threshold value, any one of a first running mode, a second running mode, and a third running mode is selected depending on first speed, second speed, or third speed so that the vehicle runs in the mode, whereby the vehicle can run by easily selecting an appropriate series hybrid mode or an appropriate parallel hybrid mode in each range depending on whether the remaining capacity is higher than the first threshold value, and running control can be made stable and easy.

8 Claims, 11 Drawing Sheets

(52) U.S. Cl.
CPC .......... *B60W 20/00* (2013.01); *B60W 2510/244* (2013.01); *Y02T 10/6217* (2013.01); *Y02T 10/6234* (2013.01); *Y02T 10/7005* (2013.01); *Y02T 10/7044* (2013.01); *Y02T 10/705* (2013.01); *Y02T 10/7077* (2013.01)
USPC ............ 701/22; 701/104; 701/110; 701/121; 477/3; 477/5; 477/15; 180/65.1

(56) References Cited

U.S. PATENT DOCUMENTS

| | | | |
|---|---|---|---|
| 2001/0004029 A1* | 6/2001 | Wakashiro et al. | 180/170 |
| 2002/0094908 A1* | 7/2002 | Urasawa et al. | 477/3 |
| 2005/0055140 A1* | 3/2005 | Brigham et al. | 701/22 |
| 2009/0222156 A1* | 9/2009 | Krueger et al. | 701/22 |
| 2011/0178686 A1* | 7/2011 | Morris | 701/51 |
| 2012/0108386 A1* | 5/2012 | Wakashiro et al. | 477/5 |
| 2012/0178686 A1* | 7/2012 | Erickson | 514/11.6 |

FOREIGN PATENT DOCUMENTS

| | | |
|---|---|---|
| JP | 11-98607 A | 4/1999 |
| JP | 2000-209706 A | 7/2000 |
| JP | 2006-77641 A | 3/2006 |
| JP | 2006-104992 A | 4/2006 |
| WO | 2008/078459 A1 | 7/2008 |

\* cited by examiner

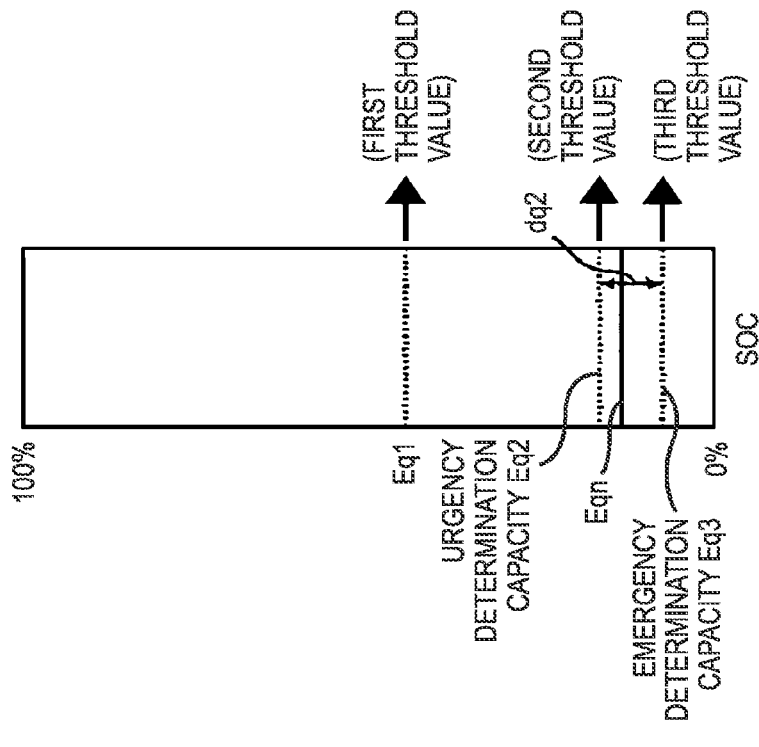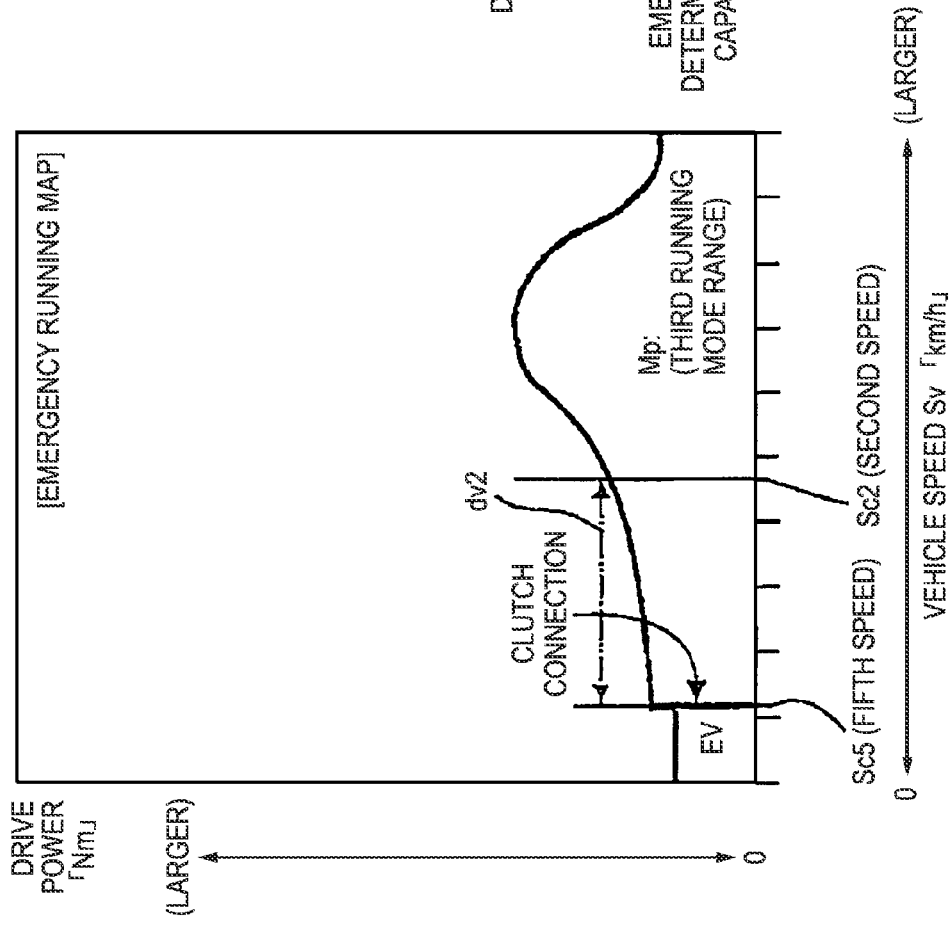

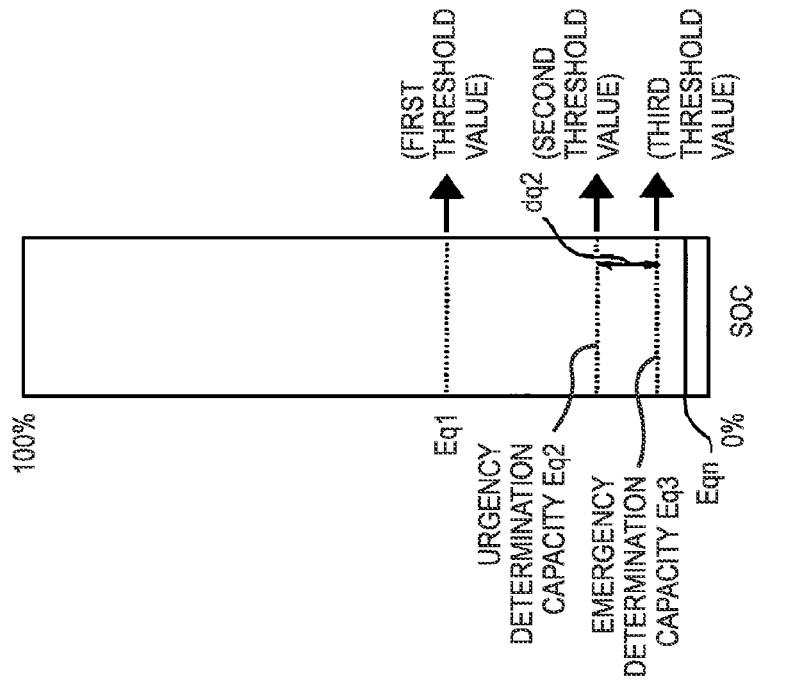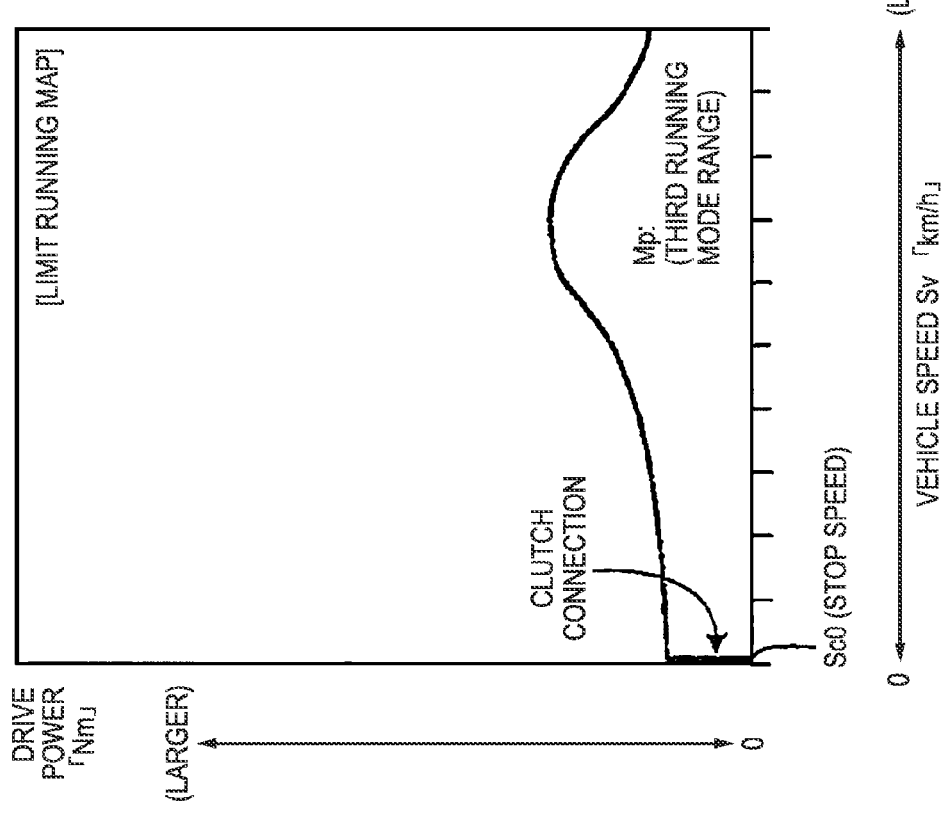

HYBRID VEHICLE

TECHNICAL FIELD

The present invention relates to a hybrid vehicle capable of running as a series hybrid vehicle that runs by using the rotation of a motor as energy and also capable of running as a parallel hybrid vehicle that runs by using the rotation of an engine as energy.

BACKGROUND ART

At present, a series hybrid vehicle in which a motor is driven by the power generation output of an electric generator driven by an engine and also driven by the discharge output of a battery and the wheels thereof are driven by the motor; a parallel hybrid vehicle in which the wheels are driven by the mechanical output of an engine; and a series-parallel hybrid vehicle capable of running in both a series hybrid mode and a parallel hybrid mode serving as the running modes of these vehicles are known as hybrid vehicles.

In the series hybrid vehicle, the wheels are driven by the electric motor; however, in the parallel hybrid vehicle, although the wheels are driven by the mechanical output of the engine, at the time of, for example, starting, acceleration and braking, the wheels can be driven so that the difference between the mechanical output of the engine and a requested output is made up for by using a rotating machine provided on the axis of the engine. In this case, acceleration is attained by making the rotating machine to act as an electric motor and deceleration is attained by making it to act as an electric generator; at the time, the battery mounted on the vehicle supplies electric power to the rotating machine (electric motor) or electric power is regenerated from the rotating machine (electric generator).

The capacity (SOC) of the battery mounted on the vehicle is herein charged not only by the regenerative electric power of the rotating machine and the electric power from an external power source but also by the power generation output of the electric generator driven by the engine. In particular, when the capacity of the battery becomes lower than a predetermined capacity while the vehicle is running, charge control is repeated by the electric power of the electric generator driven by the engine, whereby the battery capacity (SOC) is suppressed from becoming excessively low.

In the case of the series-parallel hybrid vehicle, a mechanism, such as a clutch, is used so that a mechanical connection is made between the electric generator and the electric power so as to be disengageable and engageable. When the series-parallel hybrid vehicle is run as a series hybrid vehicle, the clutch is disengaged so that the mechanical connection between the electric generator and the electric motor is separated. As a result, the power generation output of the electric generator driven by the engine is supplied to the electric motor via the battery. In this state, the vehicle can run as a series hybrid vehicle. Conversely, in the case that the vehicle is run as a parallel hybrid vehicle, the clutch is connected so that the mechanical connection is made between the electric generator and the electric motor. As a result, a state is obtained in which the mechanical output of the engine is mechanically transmitted to the drive wheels via the electric generator, the clutch, and the electric motor, and in which the vehicle can be accelerated or decelerated using the electric generator and the electric motor. In this state, the vehicle can run as a parallel hybrid vehicle.

An example of this kind of series-parallel hybrid vehicle is disclosed in Patent Document 1 (JP-A-2000-209706). In this series-parallel hybrid vehicle, two motors capable of being driven as an electric generator and an electric motor by switching are provided between the output shaft of the engine and the drive shaft on the side of the drive wheels, and a clutch and a brake are provided therebetween. When the vehicle runs in the series hybrid mode, the clutch is disengaged, the motor on the front side is made to act as an electric generator, and the motor on the rear side is made to act as an electric motor; when the vehicle runs in the parallel hybrid mode, the clutch is engaged and the vehicle runs on the rotation of the engine, or the motors on the front and rear sides are driven to make acceleration/deceleration easy.

The operation range of the motors mounted on the series hybrid vehicle is divided into a series hybrid mode range (including an EV mode range in which the engine is stopped and the motors are driven) and a parallel hybrid mode range, and the switching between the two modes is performed by the switching of the clutch that is controlled by controlling means.

For example, in Patent Document 1, controlling means performs mode switching control by using a motor operation range setting map. Various kinds of information, such as vehicle speed obtained by a vehicle speed sensor, requested torque calculated on the basis of the position of the accelerator pedal and the vehicle speed, and the remaining capacity of the battery obtained from a remaining capacity sensor, are herein input to the controlling means. Then, the controlling means basically performs control to select the series mode when the engine is in an operation state in which the engine is started/stopped, to start the engine and thereby to generate electric power using the electric generator so as to charge the battery in the case that the remaining capacity of the battery becomes equal to or less than a predetermined value, and to stop the operation of the engine and thereby to stop the power generation at the electric generator so as to prevent the battery from being overcharged in the case that the remaining capacity of the battery becomes equal to or more than the predetermined value. Furthermore, a range in which the requested torque is low is set as the series hybrid mode range, and a range in which the requested torque is high is set as the parallel hybrid mode range. The controlling means determines the running mode range, then performs clutch switching control so that the present running mode range becomes the determined target running mode range or performs switching control via inverters so that the functions of the motors are used as the functions of the electric generator and the electric motor.

In addition, a series-parallel combined hybrid vehicle system having a drive system in which a continuously variable transmission and a clutch are connected in series between an electric generator on the side of the engine and a motor on the side of the drive wheels is disclosed in Patent Document 2 (JP-A-4-297330). A series running mode in which the vehicle runs using the motor is herein usually used; in a power shortage range, the clutch is connected and a parallel running mode is selected, and then the transmission gear ratio of the continuously variable transmission is controlled to drive the engine in an operation range in which fuel efficiency is high. Furthermore, the regeneration torque in a high-speed rotation range at the time of regenerative braking is absorbed by engine friction by controlling the transmission gear ratio.

PRIOR ART DOCUMENT

Patent Document

Patent Document 1: JP-A-2000-209706
Patent Document 2: JP-A-4-297330

GENERAL DESCRIPTION OF THE INVENTION

Problem that the Invention is to Solve

In the hybrid vehicles that run in the series-parallel hybrid mode disclosed in Patent Documents 1 and 2, in the case that the operation information of the vehicle changes from that during the running in the series mode, for example, in the case that the running mode enters high-load running in which the battery capacity (SOC) lowers, the load of the running increases abruptly, and the output is requested to be raised, control is performed so that the requested torque is increased abruptly and the mode of the drive system of the vehicle is shifted to the parallel hybrid mode range.

In this case, the clutch being in a state of disengagement between the drive shaft on the side of the engine and the output shaft on the side of the drive wheels (the output shaft on the side of the motor) is switched to its engagement state.

At this time, in particular, in the low-speed operation range of the vehicle, the rotation of the drive shaft on the side of the engine is relatively high, the rotation of the output shaft on the side of the wheels is relatively low, and the difference in rotation is relatively large, whereby a torque shock is apt to occur on the output shaft on the side of the drive wheels at the time of clutch engagement and it is necessary to decrease the difference in rotation by changing the transmission gear ratio of the transmission to a high gear ratio. Furthermore, the transmission gear ratio is required to be changed in an operation range in which an increasing/decreasing change is repeated in the low-speed range in the parallel hybrid mode; moreover, in the case that the vehicle speed is increased from a low vehicle speed to a high vehicle speed, it is necessary to change the transmission gear ratio of the transmission in response to the increase in vehicle speed, whereby the transmission control is apt to become complicated.

Problems to be solved by the present invention are to lower the torque shock that occurs when the running mode is switched and to eliminate transmission control after the switching to the parallel hybrid mode range.

Means for Solving the Problem

The present invention provides a hybrid vehicle comprising: an engine mounted on the vehicle; a running-use motor; a battery for supplying electric power to the running-use motor; an electric generator for supplying electric power to the battery; vehicle speed detecting means for detecting a speed of the vehicle; and remaining capacity detecting means for detecting a remaining capacity of the battery, the vehicle having: a first running mode in which the engine is stopped, and the vehicle runs by a drive of the running-use motor; a second running mode in which the electric generator is operated by a drive of the engine, and the vehicle runs by the drive of the running-use motor; and a third running mode in which the vehicle runs by the drive of the engine and the drive of the running-use motor, the vehicle characterized by comprising mode selecting means for selecting a running mode so that in a state in which the remaining capacity is equal to or more than a predetermined first threshold value, the vehicle runs in the first running mode or in the second running mode in a case that the speed detected by the vehicle speed detecting means is less than a predetermined first speed, and the vehicle runs in the third running mode in a case that the detected speed is equal to or more than the predetermined first speed, wherein in a state in which the remaining capacity is less than the predetermined first threshold value, the mode selecting means selects the third running mode in a case that the speed detected by the vehicle speed detecting means is equal to or more than a predetermined second speed that is smaller than the predetermined first speed, the mode selecting means selects the second running mode in a case that the detected speed is less than the predetermined second speed and is equal to or more than a predetermined third speed that is further smaller than the predetermined second speed, and the mode selecting means selects the first running mode or the second running mode in a case that the detected speed is less than the predetermined third speed.

In addition, another aspect of the present invention provides the hybrid vehicle further comprising requested drive power detecting means for detecting requested drive power required for running of the vehicle, wherein in the state in which the remaining capacity is equal to or more than the predetermined first threshold value, the mode selecting means, in a case that the speed detected by the vehicle speed detecting means is less than a predetermined fourth speed that is smaller than the predetermined first speed, can select the first running mode in a range in which the detected requested drive power is equal to or less than a predetermined first drive power boundary, and the mode selecting means, in a case that the speed detected by the vehicle speed detecting means is equal to or more than the predetermined fourth speed and less than the predetermined first speed, can select the first running mode in a range in which the detected requested drive power is equal to or less than a second drive power boundary that decreases from the predetermined first drive power boundary as the vehicle speed increases, and can select the second running mode in a range in which the detected requested drive power is more than the second drive power boundary.

Furthermore, another aspect of the present invention provides the hybrid vehicle wherein in the state in which the remaining capacity is less than the predetermined first threshold value, the mode selecting means, in the case that the speed detected by the vehicle speed detecting means is less than the predetermined third speed, can select the first running mode in a range in which the detected requested drive power is equal to or less than a third drive power boundary that is smaller than the first drive power boundary, and can select the second running mode in a range in which the detected requested drive power is more than the third drive power boundary.

Moreover, another aspect of the present invention provides the hybrid vehicle wherein in a state in which the remaining capacity is further smaller than a predetermined second threshold value that is smaller than the predetermined first threshold value, the mode selecting means can select the third running mode in a case that the speed detected by the vehicle speed detecting means is larger than a predetermined fifth speed that is smaller than the predetermined third speed, and can select the first running mode in a case that the detected speed is less than the predetermined fifth speed.

Besides, another aspect of the present invention provides the hybrid vehicle wherein in a state in which the remaining capacity is further smaller than a predetermined third threshold value that is smaller than the predetermined second threshold value, the mode selecting means can select the third running mode simultaneously with a start of the vehicle.

Besides, another aspect of the present invention provides the hybrid vehicle, further comprising: a drive shaft provided with drive wheels; a transmission pathway for transmitting a power of the engine to the drive shaft; and frictional engaging means for disengaging/engaging the transmission pathway, wherein switching between the first running mode or the second running mode and the third running mode is performed by disengaging/engaging the transmission pathway using the frictional engaging means.

Still further, another aspect of the present invention provides the hybrid vehicle, wherein a drive power of the engine in the third running mode is transmitted to the drive wheels via a speed reducing device having a fixed ratio.

Advantage of the Invention

Accordingly, with the present invention, depending on whether the remaining capacity is higher than the first threshold value and depending on the first speed, second speed, and the third speed in each case of the remaining capacity, the vehicle runs by performing running mode selection so that the vehicle runs in any one of the first running mode, the second running mode, and the third running mode; hence, a classification is made as to whether the remaining capacity is higher than the first threshold value serving as a steady determination capacity, the vehicle can run easily in a series parallel hybrid mode in each range; in particular, in the case that the output of the engine is transmitted to the drive wheels in each mode while the fixed ratio is maintained, transmission control is not required to be performed at the time of the mode switching control and during operation on the high speed range side thereafter, whereby running control can be made easy.

In addition, the operation range of the first running mode can be extended and the vehicle can run in the second running mode.

Furthermore, the running in the second running mode can be continued by narrowing the range of the first running mode and by hastening the recovery of the remaining capacity of the battery.

Moreover, after the vehicle is started by the motor, shifting to the running using the engine is performed promptly, and the running mode is switched to the third running mode in which the engine is driven; hence, it is possible to securely obtain a state in which the vehicle runs and moves promptly while being driven by the engine to a place to receive maintenance so as to avoid an emergency state due to the inability of electric power generation, for example.

Besides, in the state of vehicle stop, the engine is started promptly while the clutch is in its disengagement state, and the frictional engaging means is engaged simultaneously with the starting of the vehicle, whereby the running mode is switched to the third running mode in which the mechanical output of the engine can be transmitted to the drive shaft; hence, the vehicle can run while being driven only by the engine to a place to receive maintenance so as to avoid an emergency state due to the inability of electric power generation, for example.

What's more, at the time of switching from the first running mode or the second running mode to the third running mode, the switching is gradually performed from sliding engagement to complete connection in the transmission pathway using the frictional engaging means; hence, even if the transmission pathway adopts the fixed ratio, the torque shock at the time of the mode switching can be relieved.

Still further, the drive power of the engine in the third running mode is transmitted to the drive wheels via the speed reducing device having the fixed ratio; hence, transmission control is not required to be performed in the third running mode, and running control is made easy.

BRIEF DESCRIPTION OF THE DRAWINGS

FIG. 2($b$) is a view showing the state of a parallel hybrid mode;

FIG. 3($b$) is a view illustrating a steady-time battery capacity;

FIG. 4($b$) is a view illustrating the battery capacity;

FIG. 5($a$) is a view illustrating the characteristics of a running mode setting map for use in the hybrid vehicle shown in FIG. 1 at the time when the remaining capacity of the battery is lower than an urgency determination capacity;

FIG. 5($b$) is a view illustrating the battery capacity;

FIG. 6($a$) is a view illustrating the characteristics of a running mode setting map for use in the hybrid vehicle shown in FIG. 1 at the time when the remaining capacity of the battery is lower than an emergency determination capacity;

FIG. 6($b$) is a view illustrating the battery capacity;

MODE FOR CARRYING OUT THE INVENTION

A hybrid vehicle to which the present invention is applied will be described.

In this hybrid vehicle, it is realized that the running mode thereof is easily switched to a series hybrid mode or a parallel hybrid mode in each range depending on whether the residual capacity of the battery thereof is higher than a first threshold value, and that the vehicle runs while the torque shock at the time of the switching is decreased.

Figure 1:
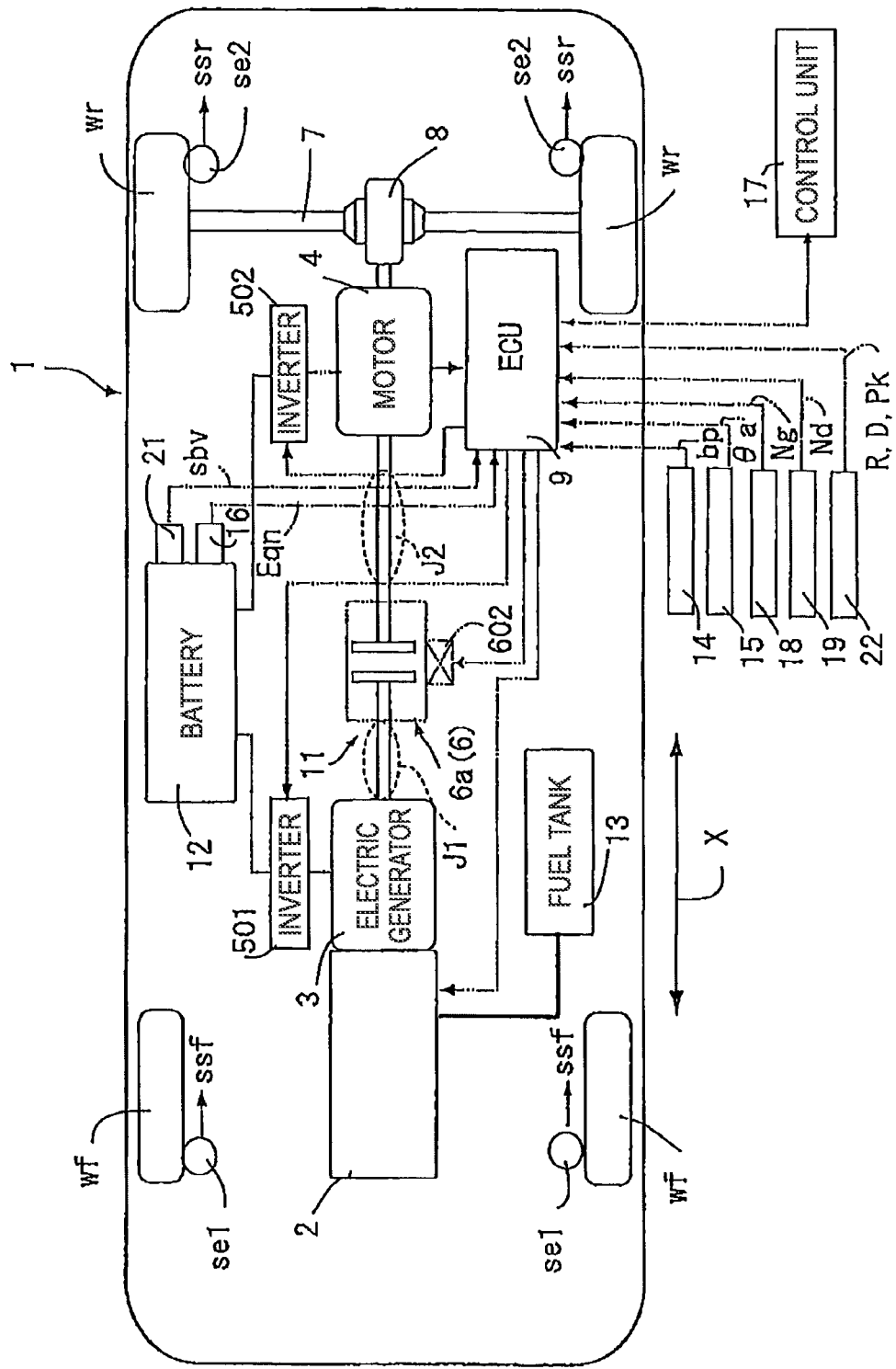
FIG. 1 is a view showing a configuration of a hybrid vehicle to which the present invention is applied.

A schematic view of a hybrid vehicle (hereafter simply referred to as a vehicle) 1 serving as "Embodiment 1" is given in FIG. 1.

This vehicle 1 is designed to run by transmitting the rotation outputs from two drive sources, an engine 2 and a motor 4, to rear wheels wr serving as drive wheels using a transmission pathway 11; the vehicle can run in a first running mode in which the vehicle runs using only the motor 4 and can also run in two other modes, a series hybrid mode (hereafter referred to as a second running mode) and a parallel hybrid mode (hereafter referred to as a third running mode).

The transmission pathway 11 of the vehicle 1 has the engine 2; an electric generator 3 connected to the output shaft J1 of the engine; a wheel side drive shaft J2 connected to the side of the rear wheels wr via a differential gear (hereafter simply referred to as a differential) 8 serving as a speed reducing device; the motor 4 connected to the drive shaft J2; and a clutch 6 serving as frictional engaging means for engaging/disengaging the pathway 11 equipped with the output shaft J1 and a drive shaft J2' on the side of the motor 4. In addition, the output shaft J1 of the engine 2 is connected to the electric generator 3 via a speed increasing device, not shown, whereby the rotation speed thereof is increased to a rotation speed range suited to the input to the electric generator 3.

Furthermore, when the clutch 6 between the electric generator 3 and the motor 4 is off (in a disengagement state), the output shaft J1 serving as the shaft of the electric generator 3 and the drive shaft J2' on the side of the motor 4 are independent of each other, and when the clutch 6 is on (in an engagement state), they are connected to each other.

The clutch 6 is a wet multi-plate clutch 6a with engagement force adjusting means 602.

Figure 2:
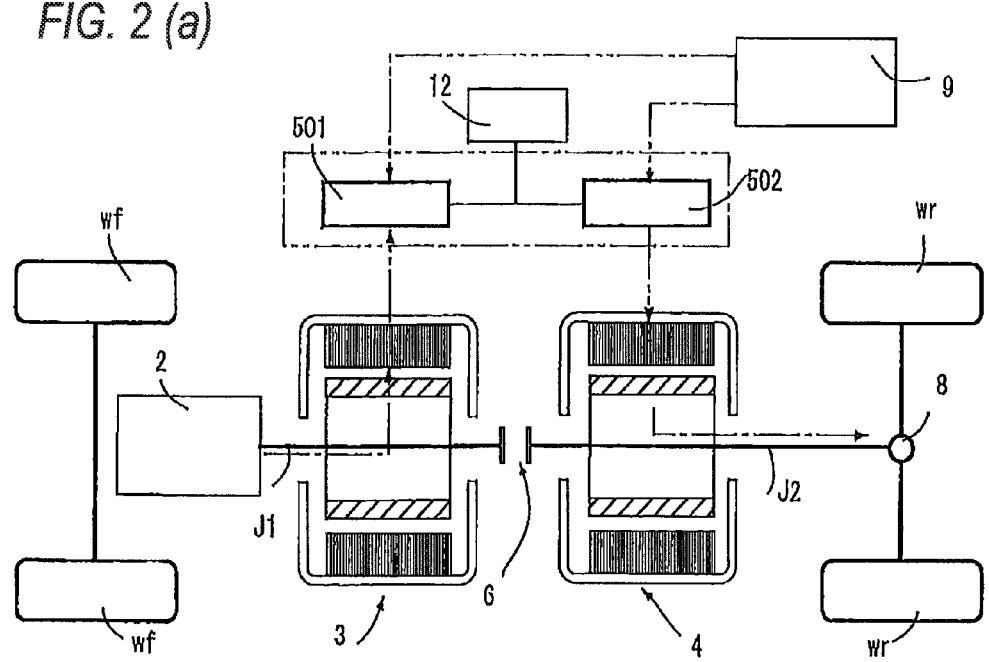
FIG. 2($a$) is a view illustrating the functions of the drive system of the hybrid vehicle shown in FIG. 1, showing the state of a series hybrid mode.
Figure 2:
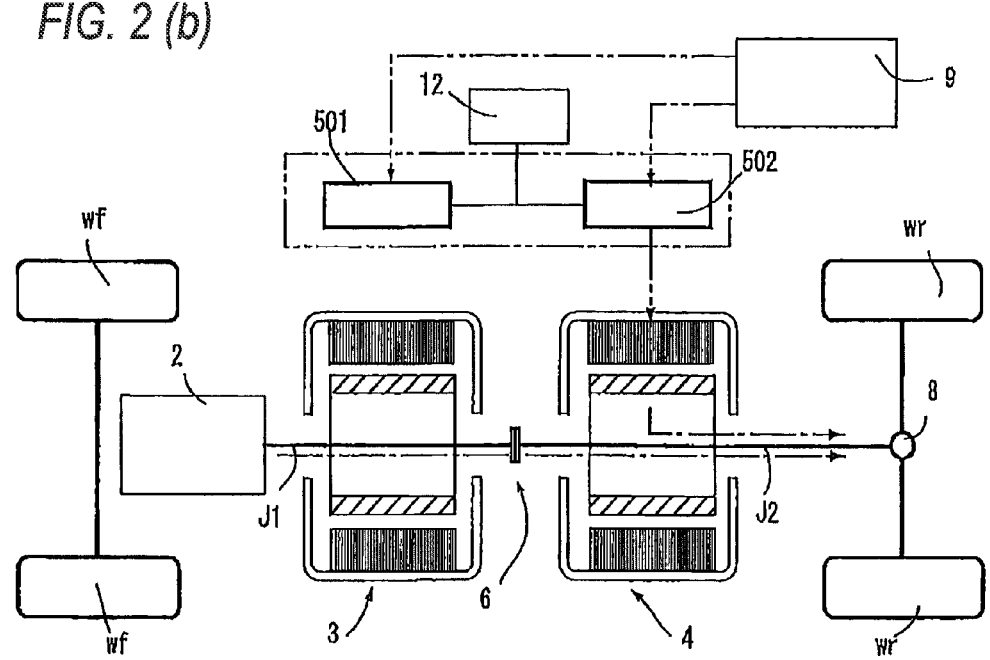

When this wet multi-plate clutch 6a is clutch-off (disengaged) (see FIG. 2(a)), the relative rotation of the plurality of rotation plates (not shown) of the drive shaft J2 on the side of the wheels with respect to the plurality of rotation plates (not shown) of the output shaft J1 on the side of the engine is allowed to be performed; and when the clutch is clutch-on (engaged) (see FIG. 2(b)), the relative rotation between the two shafts J1 and J2' is not performed, and the output shaft J1 on the side of the engine, the drive shaft J2', and the wheels wr are directly connected. Moreover, the engagement force of the wet multi-plate clutch 6a is adjusted by the engagement force adjusting means 602. In the engagement force adjusting means 602, the engagement state thereof can be switched stepwise from an engagement state to a half-clutch state and to a direct connection state by increasing or decreasing the mutual relative distance between the rotation plates of the two shafts J1 and J2'; the solenoid for this clutch is drive-controlled by an ECU 9 serving as controlling means described later.

Engagement adjusting means (not shown) for switching a single-disc clutch 6, not shown, by performing hydraulic control using a hydraulic actuator may be used instead of the wet multi-plate clutch 6a with the engagement force adjusting means 602.

At the time of mode switching, the clutch 6a that is controlled by the ECU 9 performs switching from sliding engagement to complete connection. In particular, when the switching is started from a running range EV in the first running mode (EV running mode) or a running range Ms in the second running mode (series mode) to a running range Mp in the third running mode (parallel mode), clutch control is performed so that the clutch is maintained in the half-clutch engagement state using the engagement force adjusting means 602 until the vehicle speed Sv increases from a connection vehicle speed Sc by a predetermined amount (for example, approximately 5%), so that the clutch is switched gradually from sliding engagement to complete connection, and so that the clutch is completely connected when the connection vehicle speed increases by a predetermined amount. With this configuration, the shock at the time of mode switching can be relieved in spite of the switching at an intermediate speed or more even if the transmission pathway 11 adopts a fixed transmission gear ratio (fixed ratio).

Next, a battery 12 is connected to the electric generator 3 and the motor 4 via inverters 501 and 502 that are switch-controlled by the ECU 9 described later. When the electric generator 3 and/or the motor 4 serving as rotating machines are in operation ranges in which they function as electric generators, charging power is input to the battery 12 via the inverters 501 and 502; when they are in operation ranges in which they function as electric motors, discharging power is supplied to the electric generator 3 and/or the motor 4 via the inverter 501 or 502. The ECU 9 serving as controlling means for performing the running control of the transmission pathway 11 of the vehicle 1 is disposed in the vehicle 1.

The ECU 9 is a microcomputer having a CPU, a ROM, a RAM, etc. in the inside thereof, and the CPU controls the fuel injection amount, etc. of the engine 2 according to programs recorded in the ROM.

In order that these can be controlled, various kinds of sensors for indicating the operation states of the engine 2 are connected to the ECU 9, and the control unit 17 of the vehicle is also connected thereto electrically, whereby various kinds of information are transmitted between the ECU 9 and the control unit 17 via communication. Furthermore, the ECU 9 receives various kinds of command values relating to the operation states of the engine 2 from the control unit 17 and controls the engine 2. The numeral 13 denotes a fuel tank.

An accelerator opening sensor 15 for outputting an accelerator opening ea indicating an acceleration request from a vehicle driver, a brake sensor 14 for outputting tread force by information indicating a deceleration request, vehicle speed sensors se1 for left and right front wheels wf, and vehicle speed sensors se2 for left and right rear wheels wr are connected to the ECU 9 configured as described above. The ECU 9 herein calculates the vehicle speed Sv on the basis of the average value of respective information values, that is, front and rear wheel speed values ssf and ssr, at each unit time. Furthermore, a rotation speed sensor 18 for outputting the rotation speed Ng of the electric generator 3, and a rotation speed sensor 19 for outputting the rotation speed Nd of the motor 4, an SOC sensor (remaining amount detecting means) for outputting the remaining capacity Eq of the battery 12, and a voltage sensor 21 for outputting the voltage sbv of the battery 12 are respectively connected to the ECU 9.

The ECU 9 determines whether the electric generator 3 and the motor 4 are operated as electric generators or electric motors and then controls the switching operations of the inverters 501 and 502, thereby controlling the torques of the electric generator 3 and the electric motor 4. Although the engine 2 is based on throttle full-open (WOT) operation, the ECU 9 controls the throttle opening of the engine 2 in a range in which efficiency is improved when the throttle opening is adjusted. Moreover, the ECU 9 controls the hydraulic braking force acting on the front and rear wheels wf and wr within the range of a requested braking force by performing brake control for a braking device, not shown.

Next, the features of the running control of the vehicle 1 serving as Embodiment 1 will be described.

As a first feature, the ECU 9 has a function of serving as mode selecting means A1.

Figure 3:
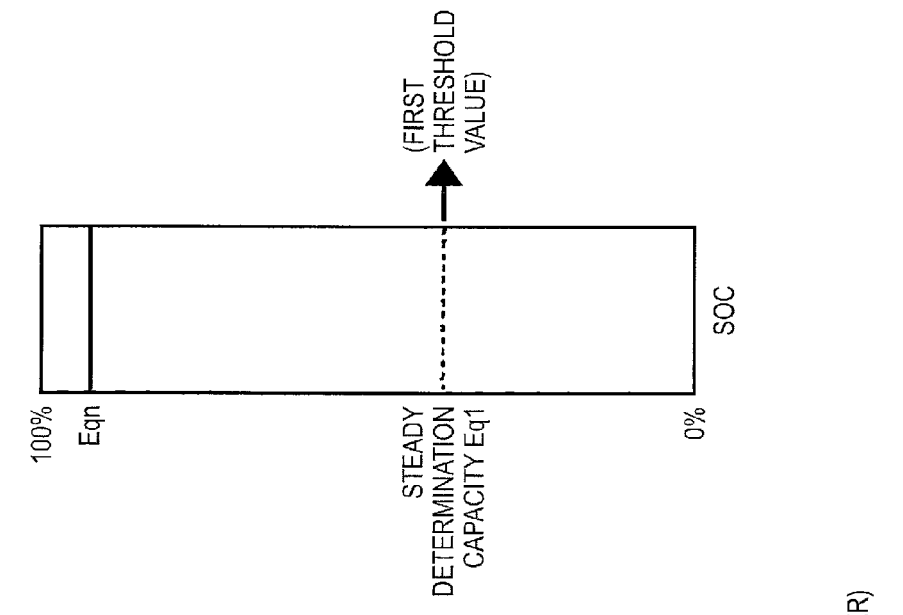
FIG. 3($a$) is a view illustrating the characteristics of a steady-time running mode setting map for use in the hybrid vehicle shown in FIG. 1.
Figure 3:
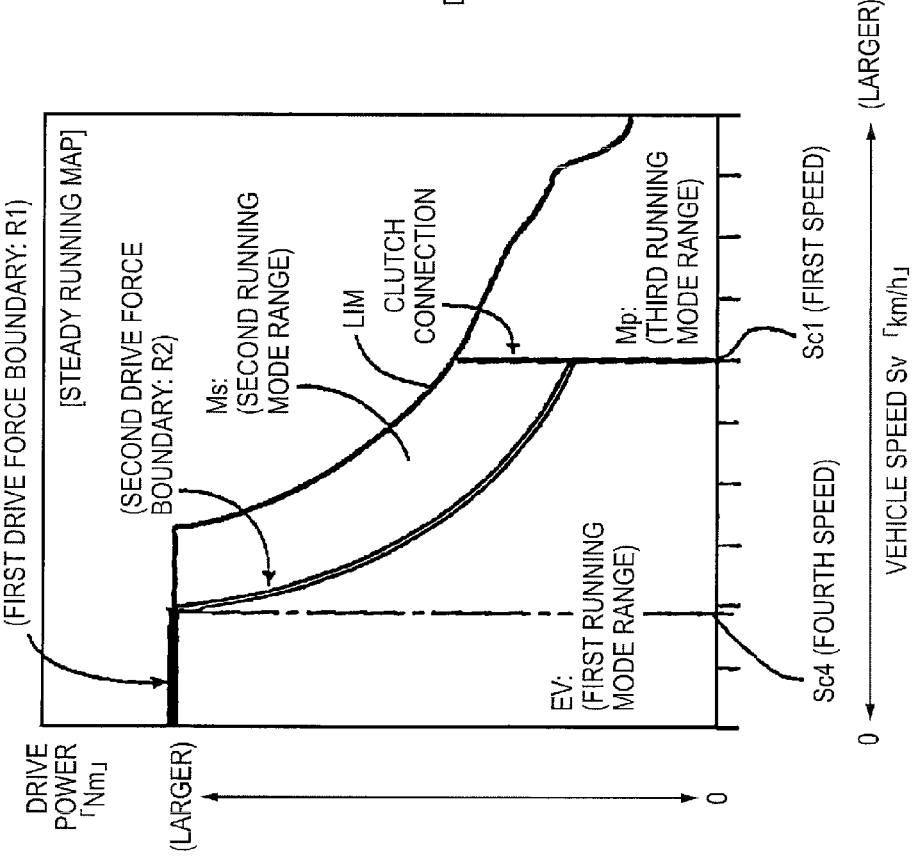
Figure 4:
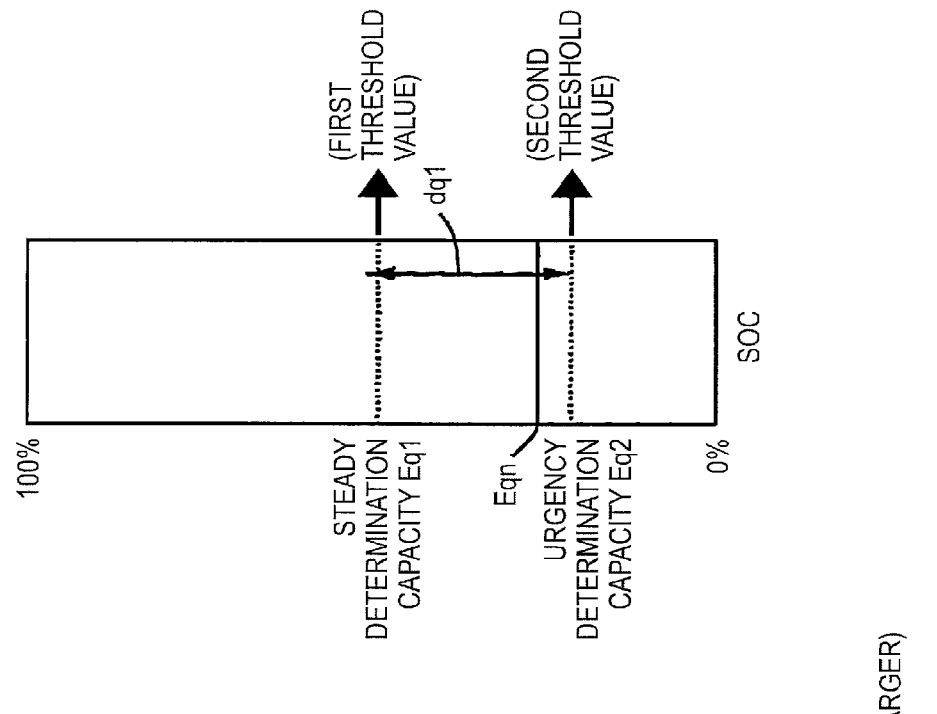
FIG. 4($a$) is a view illustrating the characteristics of a running mode setting map for use in the hybrid vehicle shown in FIG. 1 at the time when the remaining capacity of the battery is lower than a steady determination capacity.
Figure 4:
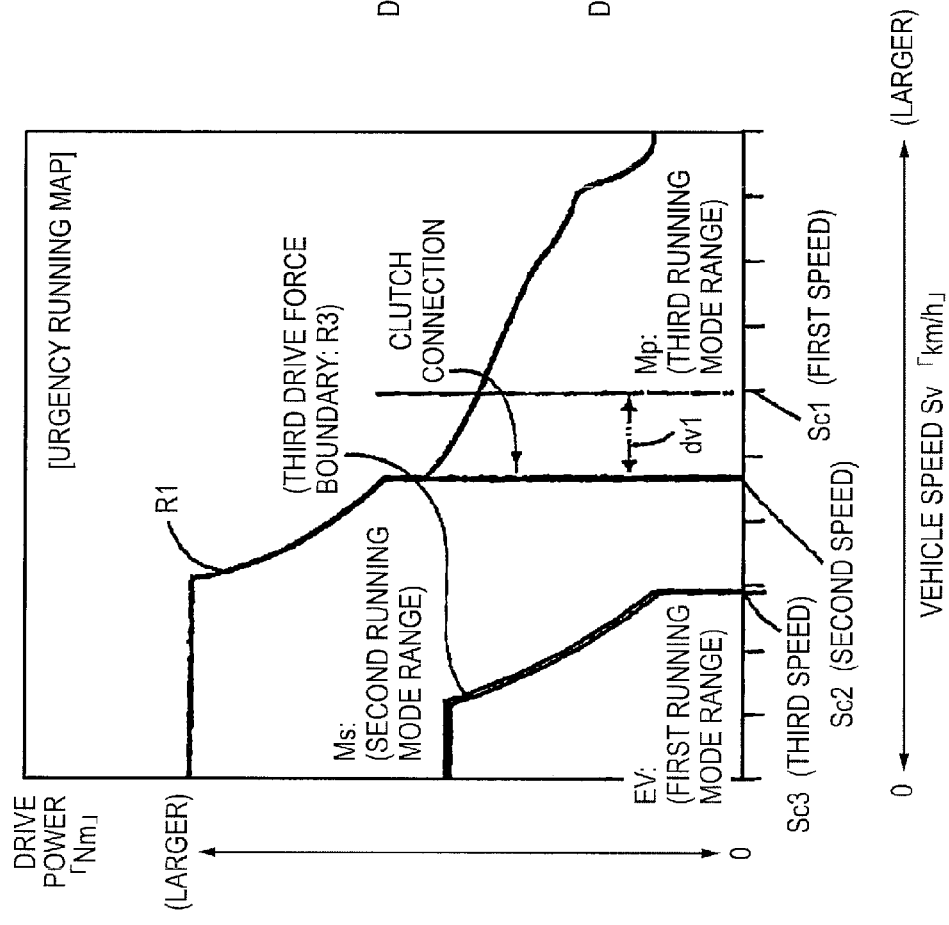

As shown in FIG. 3(a) for example, the operation range of the vehicle 1 is herein divided into the first running mode (EV mode) range EV in which the engine is stopped and the vehicle runs by driving the running-use motor, the second running mode (series hybrid mode) range Ms in which the electric generator is operated by driving the engine and the vehicle runs by driving the running-use motor, and the third running mode (parallel hybrid mode) range Mp in which the vehicle runs by driving the engine and by driving the running-use motor; these mode ranges are set and the vehicle 1 runs in any one of the mode ranges.

The mode selecting means A1 has a function of setting the running mode depending on the remaining capacity Eq of the battery 12. A plurality of running mode range setting maps (examples thereof are shown in FIGS. 3(a) to 6(a)) serving as diagrams representing the vehicle speed [km/h] and the drive power [Nm] of the vehicle for use in this setting are stored beforehand. Each map is stored in the ROM inside the ECU 9. The ECU 9 sets the operation mode of the vehicle by referring to the maps on the basis of the vehicle speed Sv and the drive power Nm (requested torque).

The running mode range setting maps are set beforehand according to the drive characteristics of the engine 2, the motor 4, and the electric generator 3 mounted on the vehicle, and the curved line LIM in the figure denotes a limit range in which the vehicle can run.

First, in a steady state in which the remaining capacity Eq is equal to or more than a first threshold value Eq1 (see FIG. 3(b)) serving as a predetermined steady determination capacity, the mode selecting means A1 performs running mode selection so that the vehicle runs in the first running mode range EV or the second running mode Ms as shown in FIG. 3(a) in the case that the vehicle speed Sv detected by the vehicle speed detecting means se1 and se2 is less than a predetermined first speed Sc1 and so that the vehicle runs in the third running mode range Mp in the case that the vehicle speed is equal to or more than the predetermined first speed Sc1; this is shown in FIG. 3(a) as a steady running map.

Furthermore, in a low capacity state in which the remaining capacity is less than the first threshold value Eq1 (see FIG. 3(b)) serving as the predetermined steady determination capacity, the mode selecting means A1 selects the third running mode range Mp (see FIG. 4(a)) in the case that the speed detected by the vehicle speed detecting means se1 and se2 is equal to or more than a predetermined second speed Sc2 (see FIG. 4(a)) that is smaller than the predetermined first speed Sc1 (see FIG. 3(a)), selects the second running mode Ms in the case that the detected speed is less than the predetermined second speed Sc2 and is equal to or more than a predetermined third speed Sc3 (see FIG. 4(a)) that is further smaller than the predetermined second speed Sc2, and selects the first running mode range Ev or the second running mode Ms in the case that the detected speed is less than the predetermined third speed Sc3; this is shown as a non-steady capacity running map in FIG. 4(a).

Furthermore, the ECU 9 has a function of serving as requested drive power detecting means A2 for detecting the requested drive power Nm.

The requested drive power detecting means A2 inside the ECU 9 calculates, using the ECU 9, the requested drive power Nm from the accelerator opening θa (output by the accelerator opening sensor 15) indicating an acceleration request from the vehicle driver during vehicle running; the mode selecting means selects the first running mode in a range in which the obtained latest requested drive power Nm is equal to or less than the line of a predetermined first drive power boundary R1 (the R1 line in FIG. 3(a)); the mode selecting means selects the first running mode EV in a range in which the detected requested drive power is equal to or less than a second drive power boundary R2 (the R2 line in FIG. 3(a)) that decreases from the first drive power boundary R1 as the vehicle speed Sv increases in the case that the speed Sv is equal to or more than a predetermined fourth speed Sc4 and less than the predetermined first speed Sc1, and selects the second running mode Ms in a range in which the requested drive power is larger than the second drive power boundary R2.

In addition, when the switching is performed from the first running mode range EV or the second running mode (series hybrid mode) range Ms to the third running mode (parallel hybrid mode) range Mp, the clutch 6a is switched from its disengagement state to its engagement state, and the switching is performed when the vehicle speed Sv becomes higher than the connection vehicle speed Sc (Sc1, Sc2).

The connection vehicle speed Sc is set beforehand depending on the maximum capacity SOC (100%) of the battery 12 mounted on the vehicle. In other words, the connection vehicle speed Sc is basically set to a larger value as the maximum capacity SOC of the battery 12 mounted on the vehicle is larger. Hence, the running range in the second running mode (series hybrid mode) range Ms in which the electric power energy of the battery 12 is used is extended, whereby it is intended that the non-polluting running range favorable for environmental preservation is extended.

Furthermore, in the case that the running in the second running mode (series running mode) range Ms is continued from a state in which the battery 12 is fully charged and has the maximum capacity SOC (100%), the steady connection vehicle speed Sc1 at the steady time is set to a value equal to or more than the intermediate speed of the vehicle as shown in the steady running map of FIG. 3(a) during a period in which the remaining capacity Eq of the battery 12 lowers but does not become lower than the first threshold value Eq1 (see FIG. 3(b)) serving as the steady determination capacity requiring recovery charging in the steady running state.

The intermediate speed has a value that is equal to or more than a lower limit value, for example, 40 [km/h], at which an engagement shock that occurs when the rotation speed of the drive shaft J2 on the side of the wheels is much lower than that of the output shaft J1 at the engagement time of the clutch 6a can be prevented. Conversely, a value that is equal to or less than an upper limit value, for example, 60 [km/h], at which an engagement shock that occurs when the rotation speed of the drive shaft J2 on the side of the wheels is too high can be prevented is set. The intermediate value is given as an example and is set beforehand depending on the vehicle; the intermediate speed value is herein set to 50 [km/h] as shown in FIG. 3(a), and this value is set as the steady engagement vehicle speed Sc1.

The second running mode (series hybrid mode) range Ms on the side of the low-speed range can be extended relatively widely by setting the steady connection vehicle speed Sc1 to a value in the vicinity of the intermediate speed of the vehicle during a period in which the capacity is not lower than the steady determination capacity (first threshold value) Eq1, and the transmission process in the second running mode (series hybrid mode) range Ms can be eliminated, whereby the running control can be made easy. In addition, since the clutch switching at the steady connection vehicle speed Sc1 is performed at the speed in the vicinity of the intermediate speed, the range in which the switching is performed is an operation range in which the rotation speed difference between the output shaft J1 and the drive shaft J2 on the side of the motor is relatively small, whereby the occurrence of a transmission shock can be suppressed.

Next, in the case that the vehicle continues running at a low vehicle speed and the operation range in which the vehicle speed is higher than the steady connection vehicle speed Sc1 is limited, the remaining capacity Eq reaches a value between the steady determination capacity (first threshold value) Eq1

(see FIG. 4(b)) and an urgency determination capacity Eq2 that is lower than the steady determination capacity Eq1 by a predetermined amount dq1.

In this case, since the operation range in which recovery charging is performed is highly required to be extended, the low-capacity-time connection vehicle speed Sc2 that is lower than the steady connection vehicle speed Sc1 (intermediate speed) by a predetermined amount dv1 is set as shown in the urgency running map of FIG. 4(a).

Since the low-capacity-time connection vehicle speed Sc2 is set to a value shifted to a relatively low speed side from the intermediate speed of the vehicle so as to be lower than the intermediate speed, the vehicle speed frequently becomes higher than the low-capacity-time connection vehicle speed Sc2 even in an operation range in which low-speed running continues in the second running mode (series hybrid mode) range Ms; at this time, the clutch 6a is engaged, the mode range is switched to the third running mode (parallel hybrid mode) range Mp, and the drive range of the engine 2 is extended, whereby it is possible that the remaining capacity Eq of the battery 12 is changed relatively early so as to be increased.

Moreover, in a state in which the remaining capacity Eq is less than the first threshold value Eq1 and in the case that the speed Sv is less than the predetermined third speed Sc3, setting is performed so that the first running mode range EV is selected in a range (see FIG. 4(a) in which the requested drive power detected by the requested drive power detecting means A2 is equal to or less than the third drive power boundary R3 that is smaller than the first drive power boundary R1, and so that the second running mode Ms is selected in a range in which the requested drive power is larger than the third drive power boundary R3.

In the low-capacity-time running map of FIG. 4(a), the first running mode range EV in which the engine is not operated is set so as to be narrower to the low-speed side than the first running mode range EV shown in the steady running map of FIG. 3(a), whereby the remaining capacity Eq of the battery 12 is recovered early.

Next, when the vehicle runs continuously at a low vehicle speed, in the case that the electric power generation circuit on the side of the electric generator is brought into an abnormal state, it is assumed that the remaining capacity Eq of the battery 12 lowers excessively, becomes lower than the urgency determination capacity Eq2 by a predetermined amount dq2, and reaches a capacity between the urgency determination capacity Eq2 and an emergency determination capacity Eq3 (see FIG. 5(b)).

In this case, it is regarded that the electric power generation circuit on the side of the electric generator is brought into an abnormal state, and it is necessary that after the starting using the motor (EV running), the running mode range should be shifted promptly to the third running mode (parallel hybrid mode) in which the engine is driven.

Hence, in the case that the remaining capacity Eq of the battery is lower than the urgency determination capacity Eq2 as shown in the view illustrating the battery capacity of FIG. 5(b), an urgency connection vehicle speed Sc5 that is lower than the low-capacity-time connection vehicle speed Sc2 by a predetermined amount dv2 is set.

In the case that it is regarded that the electric power generation circuit on the side of the electric generator is brought into the abnormal state and that the steady electric power generation function thereof does not work as described above, the clutch 6a is disengaged promptly in the first running mode range EV, the engine 2 is started, and the clutch is engaged, whereby the vehicle enters operation in the parallel mode range Mp. Hence, the vehicle can run and move promptly while being driven by the engine to a factory or the like to receive maintenance so as to avoid an emergency state due to the inability of electric power generation.

Next, if the remaining capacity Eq of the battery 12 lowers excessively and becomes lower than the emergency determination capacity Eq3, the EV running is not performed at such a remaining capacity is Eqn, and the state of stop vehicle speed Sc0 (see FIG. 6(a)) is determined, the clutch is disengaged, and the engine 2 is started by using the remaining capacity Eqn. Then, the vehicle is started by controlling the clutch so that its half-clutch engagement state is shifted to its complete engagement state; in other words, the starting is performed in the third running mode (parallel hybrid mode) range Mp in which the engine is driven, and a state is securely obtained in which the vehicle runs and moves promptly to a factory or the like to receive maintenance so as to avoid a failure state due to the inability of electric power generation, for example.

As described above, since the determination value at which the clutch is switched from its disengagement state to its engagement state is set depending on the connection vehicle speed Sc and the generated torque of the motor lowers when the remaining capacity Eq of the battery lowers, the switching to the third running mode range Mp in which the engine is driven is hastened to recover the remaining capacity Eq. In other words, the connection vehicle speed Sc is set to a low value in response to the lowering of the remaining capacity Eq of the battery, that is, Sc1>Sc2>Sc5>Sc0. As a result, the drive range of the motor is narrowed, the drive range of the engine, and the drive range of the electric generator are extended, and the operation range of the electric generator 3 is extended in response to the lowering of the remaining capacity Eq of the battery, whereby the recovery of the remaining capacity Eq of the battery can be hastened.

Next, the operation of the drive system of the vehicle 1 will be described referring to a running control routine shown in FIG. 7.

Figure 7:
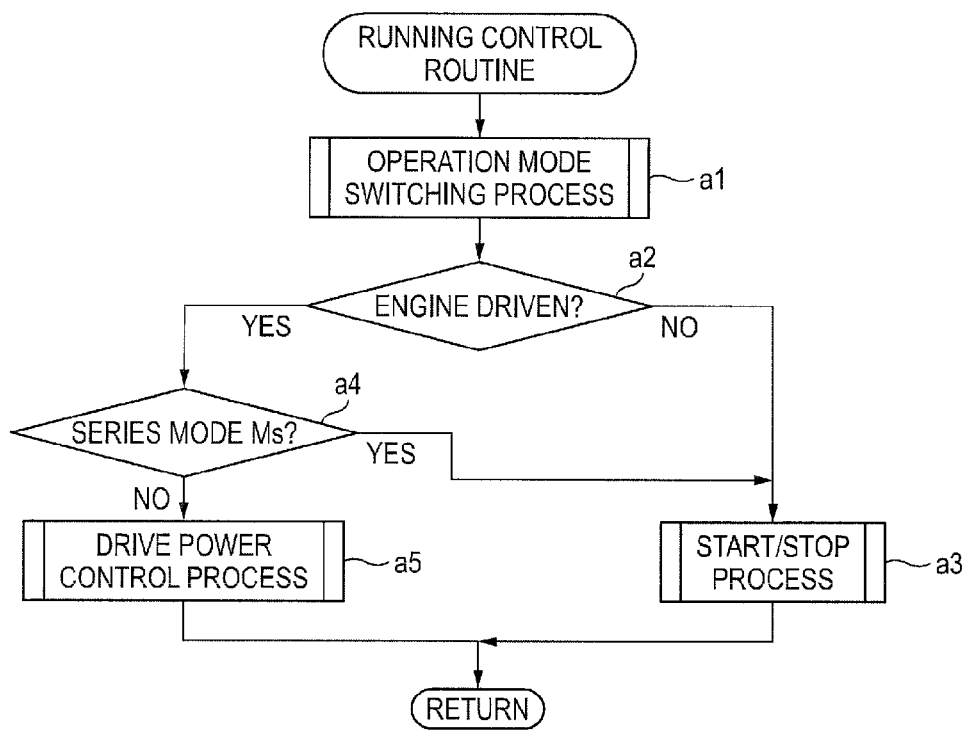
FIG. 7 is a flowchart of a running control routine for use in the hybrid vehicle shown in FIG. 1.
Figure 8:
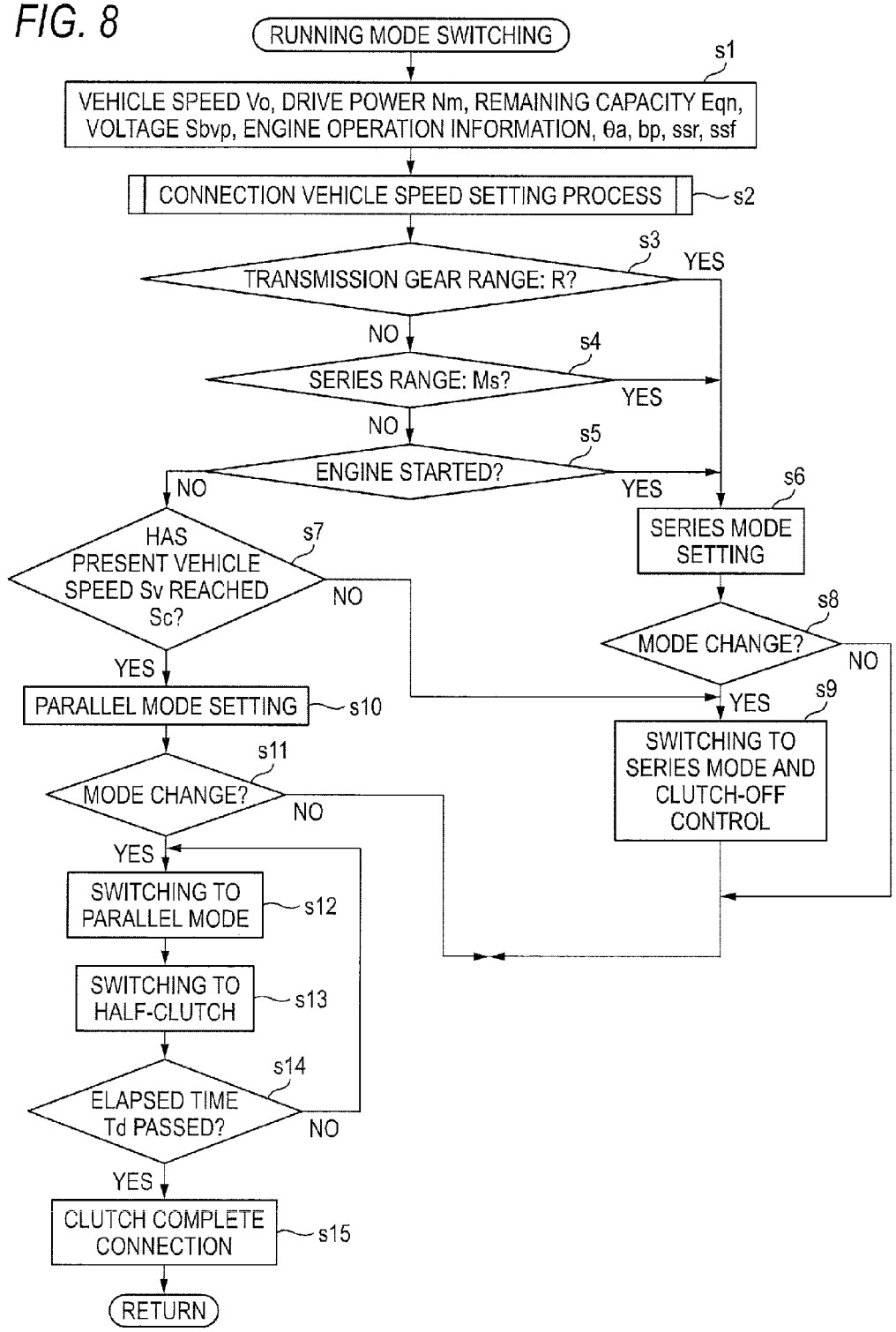
FIG. 8 is a flowchart of a running mode switching routine for use in the hybrid vehicle shown in FIG. 1.

FIG. 7 is a flowchart of running control processing. When this processing is started, the ECU 9 first executes a running mode switching process (at step a1). The flowchart of the running mode switching process is shown in FIG. 8.

In the running mode switching process routine, the ECU 9 reads various kinds of parameters relating to the operation states of the vehicle (at step s1). The parameters herein include the wheel speeds ssr and ssf (the vehicle speed Sv), the drive power Nm detected by the requested drive power detecting means A2, the remaining capacity Eqn of the battery, the battery voltage sbv, the accelerator pedal position θa, the braking operation bp, shift positions, engine operation information, etc.

The vehicle speed Sv is detected depending on the average value of the wheel speeds ssr and ssf of the four wheels wf and wr. The drive power Nm can be calculated on the basis of the accelerator pedal position θa detected by the accelerator pedal position sensor 15 and the vehicle speed Sv. The remaining capacity Eq of the battery 12 is detected by the SOC (remaining capacity) sensor 16, and the voltage sbv of the battery 12 is detected by the voltage sensor 21.

Furthermore, various kinds of information relating to reverse R, running D, and parking Pk are received by the shift position sensor 22 of a shift lever (not shown). Moreover, the engine operation state means whether or not the engine 2 is operated at present and the state can be detected through the communication with the control unit 17 of the vehicle.

On the basis of the operation information detected as described above, the ECU 9 sequentially switches the running modes according to preset conditions.

First, when the processing reaches step s2 of the running mode switching routine, the routine enters the process of setting the connection vehicle speed Sc in which the clutch 6a is turned on to perform mode switching.

Figure 9:
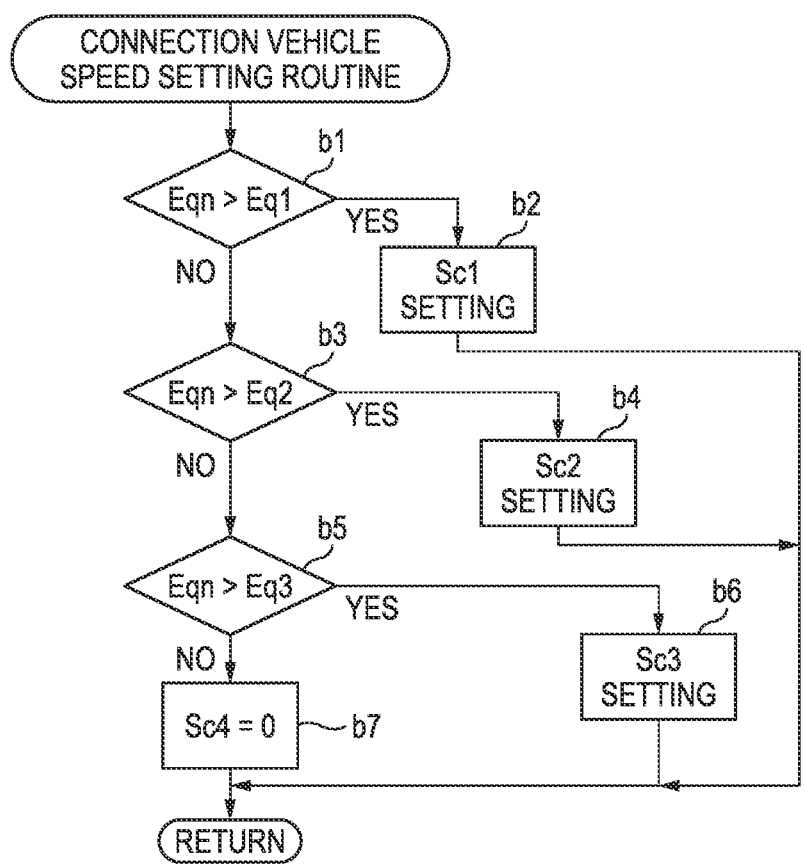
FIG. 9 is a flowchart of a connection vehicle speed setting routine for use in the hybrid vehicle shown in FIG. 1.

A connection vehicle speed setting routine is shown in FIG. 9.

At step b1 of this connection vehicle speed setting routine, a determination is made as to whether the remaining capacity Eq of the battery 12 is higher than the steady determination capacity (first threshold value) Eq1 shown in FIG. 3(b); in the case that the remaining capacity is lower, the processing advances to step b3; in the case that the remaining capacity is higher, the connection vehicle speed Sc1 serving as the intermediate speed is set at step b2, and the processing returns to step s3. The steady determination capacity (first threshold value) Eq1 is herein set as a capacity having a level at the time of discharge in which recovery close to the total capacity (100%) of the battery can be attained easily by the recovery charge of the battery 12 by performing a steady charging process. The connection vehicle speed Sc1, serving as the intermediate value, is herein set to 60 [km/h].

At step b3, a determination is made as to whether the remaining capacity Eqn of the battery 12 is higher than the urgency determination capacity Eq2 shown in FIG. 4(b); in the case that the remaining capacity is lower, the processing advances to step b5; in the case that the remaining capacity is higher, the low-capacity connection vehicle speed Sc2 is set at step b4, and the processing returns to step s3 of the running mode switching routine. At step b5, a determination is made as to whether the remaining capacity Eqn of the battery 12 is higher than the emergency determination capacity Eq3 shown in FIG. 5(b); in the case that the remaining capacity is lower, the processing advances to step b7; in the case that the remaining capacity is higher, the emergency connection vehicle speed Sc3 is set at step b6, and the processing returns to step s3 of the running mode switching routine. In the case at step b7, the remaining capacity Eqn of the battery 12 is lower than the emergency determination capacity Eq3, and the setting of the stop vehicle speed Sc4=0 is done, and the processing returns to step s3.

As described above, in the connection vehicle speed setting routine of FIG. 9, as the remaining capacity Eqn of the battery 12 lowers, the connection vehicle speed Sc is set to a lower value; then, the processing advances to step s3 of the running mode switching routine.

When the processing reaches step s3 of the running mode switching routine of FIG. 8, a determination is made at this step as to whether the present shift position is reverse R; in the case of reverse R, the switching of the inverter 502 is performed to reverse the rotation of the motor 4. Then, the processing advances to step s6; otherwise, the processing advances to step s4, and a determination is made as to whether the present mode is in the second running mode (second running mode) range Ms. In the case of the second running mode range Ms, the processing advances to step s6; otherwise, the processing advances to step s5, and a determination is made as to whether the engine is started; in the case that the engine is started, the processing advances to step s6; otherwise, the processing advances to step s7.

It is assumed that the processing reaches step s6 while the second running mode range Ms continues. At this step, the second running mode range Ms is set while the running mode is not in the first running mode range EV, and the processing advances to step s8.

In the case that a determination is made at step s8 that the present mode is in the second running mode (series hybrid mode) range Ms and that the running mode is required to be changed, the processing advances to step s9; in the case that the running mode is not required to be changed, the processing directly advances to step a2 of the running control routine shown in FIG. 7.

At step s9, the state of the engagement force adjusting means 602 (see FIG. 1) of the wet multi-plate clutch 6a is switched to its clutch-off (disengagement) state, and the relative rotation between the output shaft J1 on the side of the engine and the drive shaft J2 on the side of the wheels is allowed to be performed. The motor 4 serving as an electric motor is herein driven so as to output the drive power Nm corresponding to the accelerator operating θa having been set at the time. This output of the motor 4 drives the rear wheels wr serving as drive wheels via the differential 8.

Furthermore, when the running range enters the first running mode range EV, the engine 2 is stopped; when the running range departs from the first running mode range EV, in the second running mode range Ms, control is performed so that the engine is driven at a predetermined rotation speed Nen and at a predetermined throttle opening θs (for example, full open) in the highly efficient operation range thereof. After the process at step s9, the processing advances to step a2 of the running control routine shown in FIG. 7.

In the running mode switching routine of FIG. 8, in the case of normal running instead of the engine being started, the processing advances to step s7.

A determination is made at this step as to whether the vehicle speed Sv has reached the connection vehicle speed Sc (Sc1, Sc2, Sc5, Sc0) set at step s2; in the case that the vehicle speed has not reached, the processing advances to step s9 to maintain the running mode in the second running mode range Ms. In the case that the vehicle speed has reached, the processing advances to step s10; at this step, the present running mode is set to the third running mode (parallel hybrid mode) range Mp; then, in the case that the present mode has already been in the third running mode range Mp at step s11, the processing advances to step a2 of the running control routine shown in FIG. 7; in the case that the present mode is in the second running mode (series hybrid mode) range Ms, the processing advances to step s12.

At step s12, it is confirmed that the vehicle speed has reached the connection vehicle speed Sc (Sc1, Sc2, Sc5, Sc0), and the processing advances to the step in which the running mode is switched to the third running mode range Mp.

At step s13, the engagement force adjusting means 602 of the wet multi-plate clutch 6a is operated, the engagement between the output shaft J1 on the side of the engine and the drive shaft J2 on the side of the wheels is switched to the half-clutch state, the engine 2 is driven, and the motor 4 is controlled so as to be driven via the inverter 502. Furthermore, at step s14, waiting is done until a predetermined elapsed time Td passes, and the processing advances to step s15 after the passage. At this step, the engagement force adjusting means 602 is operated so that the engagement is switched to the clutch-on (complete engagement) state (see FIG. 2(b)); after smooth mode switching is attained, the processing advances to step a2 of the running control routine shown in FIG. 7.

In the above-mentioned switching from the second running mode (series hybrid mode) range Ms to the third running mode range Mp at step s12, the switching time point thereof is different depending on the magnitude of the connection vehicle speed Sc (Sc1, Sc2, Sc5, Sc0).

In other words, the switching to the third running mode range Mp is performed at the vehicle speed Sc1 in the vicinity of the intermediate speed in the case that the remaining capacity is equal to or more than the steady determination capacity (the first threshold value) Eq1; the switching is performed at the urgency vehicle speed Sc2 on the lower speed side from the vicinity of the intermediate speed by the predetermined amount dv1 in the case that the remaining capacity is equal to or more than the urgency determination capacity Eq2; the switching is performed at the vehicle speed Sc5 on the lower speed side from the vehicle speed Sc2 by the predetermined amount dv2 in the case that the remaining capacity is equal to or more than the emergency determination capacity Eq3; and the switching is performed at the stop vehicle speed Sc0 in the case that the remaining capacity is equal to or less than the emergency determination capacity Eq3.

Hence, basically, during the steady operation in which the remaining capacity is equal to or more than the steady determination capacity (first threshold value) Eq1, the steady determination vehicle speed Sc1 is set to a value in the vicinity of the intermediate speed, and the motor drive range (second running mode range Ms) is extended relatively widely, that is, the running range in which high priority is given to environmental preservation is extended.

On the other hand, in the case that the low-speed operation range continues and that the remaining capacity Eqn of the battery becomes lower than the steady determination capacity (first threshold value) Eq1 and has reached an amount between the steady determination capacity Eq1 and the urgency determination capacity Eq2, the low-capacity-time connection vehicle speed Sc2 is made lower than the steady connection vehicle speed Sc1, whereby the electric power generation range is extended so that the remaining capacity Eqn of the battery becomes higher than the steady determination capacity (first threshold value) Eq1.

Furthermore, in the case that the electric power generation circuit is likely to be faulty and that the urgency determination capacity Eq2 of the battery becomes lower than the low-capacity-time connection vehicle speed Sc2 and has reached an amount between the capacity and the emergency determination capacity Eq3, the urgency connection vehicle speed Sc3 is made further lower than the urgency connection vehicle speed Sc2; when the running mode enters EV running, the engine is driven promptly so that the vehicle can run while being driven by the engine to a factory to receive maintenance so as to avoid failure.

In particular, in the case that the electric power generation circuit is faulty and that the remaining capacity Eqn of the battery is lower than the emergency determination capacity Eq3, Ev running is not performed, and engine starting is directly performed with the clutch disengaged, and then after the starting, the engine is driven so that the vehicle can run to a factory to receive maintenance so as to avoid failure.

Next, it is assumed that the processing returns to step a2 of the running control routine of FIG. 7.

At this step, a determination is made as to whether the engine 2 is driven; in the case that the engine is not yet driven, the processing advances to the start/stop process routine at step a3; in the case that the engine is driven, the processing advances to step a4.

Figure 10:
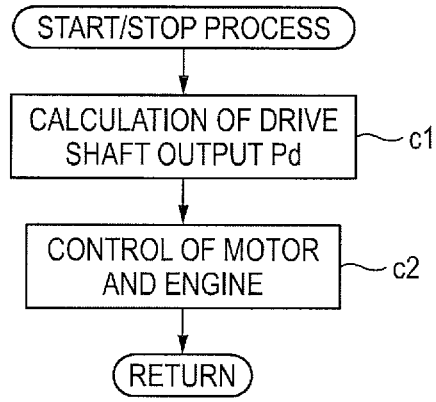
FIG. 10 is a flowchart of a start/stop process routine for use in the hybrid vehicle shown in FIG. 1.

As shown in FIG. 10, in the start/stop process routine, output control is herein performed during operation, such as starting, EV running, and stop. At step c1, in the case that the vehicle speed Sc is smaller than a predetermined value and the vehicle is assumed to be stopped, it is confirmed that the voltage sbv of the battery 12 detected by the voltage sensor 21 is higher than a predetermined value (a voltage at which starting is possible) and that a starting command has been input. Next, the ECU 9 calculates drive output Pds for starting according to a predetermined start output map (not shown) and controls the starting of the motor 4 at step c2 to start the motor 4. After this starting, while the running mode is in the first running mode range EV, the ECU 9 calculates a target acceleration torque Tac on the basis of the accelerator pressing amount ea and calculates a target brake torque Tbp on the basis of the brake pressing force by at steps c1 and C2. Furthermore, the total torque Tt of the target acceleration torque Tac and the target brake torque Tbp is obtained, Tt=Tac+Tbp. The drive power Tv [Nm] at the vehicle speed Sv is obtained from the point in which the drive output Pd [kW] is determined by the product of the total torque Tt and the target rotation speed Nd of the drive shaft J2 according to the preset steady running map of FIG. 3(a) (the other running maps shown in FIGS. 4(a) to 6(a) are adopted depending on the remaining capacity Eqn of the battery). In this case, the drive power Tv [Nm] is set appropriately in proportion to the accelerator pressing amount θa.

The target rotation speed Nd of the drive shaft J2 is herein obtained by dividing the drive output Pd [kW] by the total torque Tt, and the motor 4 is controlled so that the target rotation speed Nd is obtained, whereby running conforming to the request of the driver can be attained. At step c2, in the case that the engine is not started at the time point when an operation point in the second running mode (series hybrid mode) range Ms other than EV running is reached, the engine is started. At this time, the engine starting is performed by switching the engagement force adjusting means 602 of the wet multi-plate clutch 6a to its clutch-off (disengagement) state and by operating the electric generator 3 mechanically connected to the engine 2 as an electric motor; at the time, the engine starting control is performed in a preset control mode so that the engine can be driven with high efficiency.

On the other hand, in the case that the running mode is in the second running mode range Ms or the third running mode range Mp other than the first running mode range, since the engine is driven, the processing advances to step a4 of the running control routine of FIG. 7. In the case that the engine is driven in the second running mode range Ms other than the first running mode range at this step, the processing returns to the start/stop process routine of step a3; in the case that the engine is driven in the third running mode range Mp, the processing advances to step d1 of the parallel running control routine shown in FIG. 11.

Figure 11:
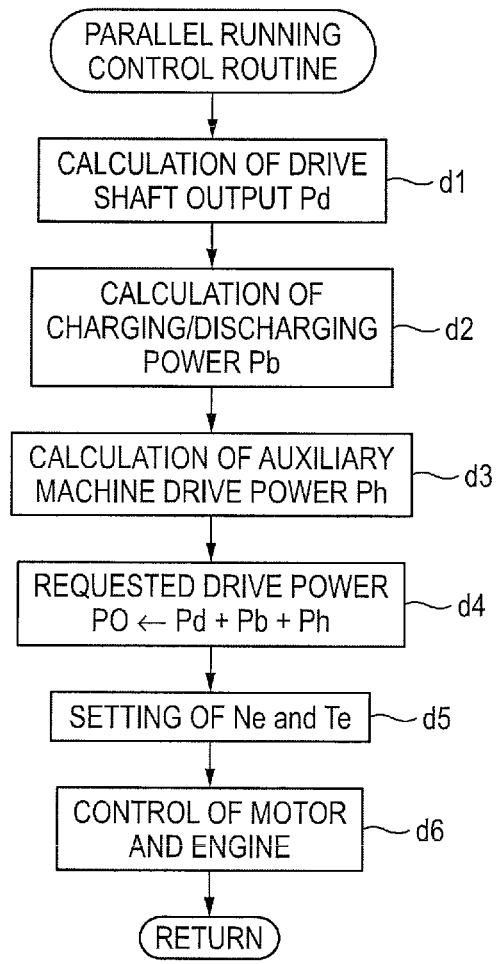
FIG. 11 is a flowchart of a parallel running control routine for use in the hybrid vehicle shown in FIG. 1.

At step d1 of the parallel running control routine shown in FIG. 11, as in the case of step c1, the target acceleration torque Tac is calculated on the basis of the accelerator pressing amount θa, and the target brake torque Tbp is calculated on the basis of the brake pressing force bp. Furthermore, the total torque Tt of the target acceleration torque Tac and the target brake torque Tbp is obtained, Tt=Tac+Tbp. The drive power Tv [Nm] at the vehicle speed Sv is obtained from the point in which the drive output Pd [kW] is determined by the product of the total torque Tt and the target rotation speed Nd of the drive shaft J2 according to the preset steady running map of FIG. 3(a) (the other running maps shown in FIGS. 4(a) to 6(a) are adopted depending on the remaining capacity Eqn of the battery). In this case, the drive power Tv [Nm] is set appropriately according to the accelerator pressing amount Oa and the value of the steady running map of FIG. 3(a).

Next, charging/discharging power Pb and auxiliary machine drive energy Ph are calculated (at steps d2 and d3). The charging/discharging power Pb is energy required for charging/discharging the battery 12, having a positive value in the case that the battery 12 is required to be charged and having a negative value in the case that the battery is required to be discharged. The auxiliary machine drive energy Ph is electric power that is required to drive an auxiliary machine, such as an air conditioner. The total of the electric power values calculated as described above amounts to requested drive power PO (at step d4).

Next, on the basis of the requested drive power PO having been set as described above, the ECU 9 sets engine rotation speed Ne (Nea>Neb>Nec) serving as the operation point of the engine 2 and engine torque Te (Tea>Teb>Tec) according to the preset operation map (see FIG. 12) of the engine 2 (at step d5).

Figure 12:
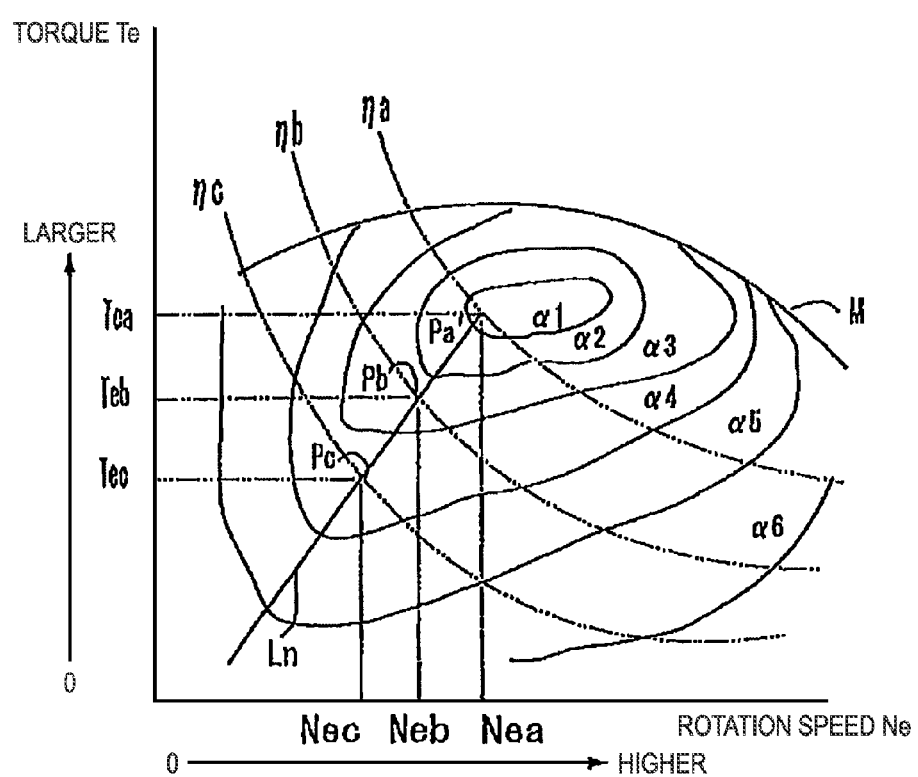
FIG. 12 is a diagram showing the operation range characteristics of an engine for use in the hybrid vehicle shown in FIG. 1.

FIG. 12 shows the operation state of the engine 2 with the engine rotation speed Ne on the horizontal axis and the torque Te on the vertical axis. The curved line M in the figure indicates a limit range in which the operation of the engine 2 is possible. Each of curved lines α1 to α6 indicates an operation point in which the operation efficiency of the engine 2 is constant. The operation efficiency lowers in the order of α1 to α6. In addition, each of curved lines ηa to ηc indicates a line (ηa>ηb>ηc) in which the power (rotation speed×torque) output from the engine 2 is constant.

As shown in FIG. 12, the operation efficiency of the engine 2 is significantly different depending on the rotation speed and the torque. The locus of the change in each torque in which the operation efficiency becomes high in response to the rising change in the rotation speed of the engine is shown, for example, as the curved line Ln (different depending on the change range of the rotation speed) in FIG. 12. This kind of operation map is stored in the ROM of the ECU 9.

Hence, the present operation point of the engine 2 is set as an operation point in which the operation efficiency thereof becomes high. In other words, when the engine torque Te targeted as an operation point in which the operation efficiency corresponding to the present accelerator opening θa becomes high is obtained, a rotation speed Neo in which engine efficiency to be targeted is high is obtained from the map.

The amount of fuel supply is herein controlled so that the rotation speed of the crankshaft converges to the engine rotation speed Neo to be targeted. In this case, the amount of fuel injection Qt to the engine 2 is controlled by adding a correction amount (+dq or −dq) changing depending on the difference in the rotation speed of the engine to a reference amount of fuel injection Qb depending on operation information, whereby control is performed so that the actual rotation speed of the engine is made to converge to the target rotation speed Neo of the engine (at step d6).

In the third running mode range Mp described above, the motor 4 is driven when the operation range of the engine corresponds to abrupt acceleration or in the case that the operation range is determined to have reached high load operation exceeding a predetermined level.

When this kind of transient operation is detected, the ECU 9 performs control to deliver predetermined motor drive power according to a preset predetermined drive mode and to improve the responsiveness to the change in the operation range of the vehicle.

In the hybrid vehicle that is driven as described above, when the vehicle speed Sv is on its low-speed side, the second running mode range Ms is used, when the vehicle speed becomes higher than the predetermined connection vehicle speed Sc and reaches its high speed side, the clutch 6a is engaged and the mode is switched to the third running mode range Mp, and a fixed transmission gear ratio (fixed ratio) is maintained at the time of the mode switching control and during operation on the high speed range side thereafter, whereby transmission control is not required to be performed and running control is made easy. In particular, in the case that the battery is repeatedly subjected to steady recovery charging and the remaining capacity Eq of the battery 12 is equal to or more than the steady determination capacity (first threshold value) Eq1, clutch switching is performed in the vicinity of the intermediate speed, whereby the difference in rotation between the output shaft J1 and the drive shaft J2' becomes relatively small and the occurrence of a transmission shock can be suppressed.

In addition, the connection vehicle speed Sc is set higher as the maximum capacity SOC of the battery 12 is larger, whereby the running range in the second running mode range Ms in which electric power energy is used is extended and non-polluting can be promoted.

Furthermore, since the generated torque of the motor lowers when the remaining capacity Eq of the battery becomes low, the connection vehicle speed Sc is set low so that the switching to the third running mode range Mp in which the engine is driven is hastened; for example, the low-capacity-time connection vehicle speed Sc2 lower than the steady-time connection vehicle speed Sc1, the urgency connection vehicle speed Sc5 lower than the low-capacity-time connection vehicle speed Sc2, and the stop vehicle speed Sc0 are set, and when the vehicle speed becomes lower than the connection vehicle speed serving as the threshold value having been set depending on the remaining capacity Eq of the battery 12, the operation range of the electric generator 3 is extended and the recovery of the remaining capacity Eq of the battery can be hastened; in addition, the vehicle can run and move promptly while being driven by the engine to a place to receive maintenance so as to avoid an emergency state, such as the inability of electric power generation, and stable running is securely obtained.

Furthermore, when the switching from the second running mode range Ms to the third running mode range Mp is started, the half-clutch state is maintained until the predetermined elapsed time Td passes from the time point at which the vehicle speed Sv becomes higher than the connection vehicle speed Sc; after the passing of the time, switching is performed the complete connection state; hence, even if the rotation transmission pathway 11 adopts the fixed transmission gear ratio (fixed ratio), the shock at the time of the mode switching can be relieved securely.

In the hybrid vehicle shown in FIG. 1, the engagement force of the wet multi-plate clutch 6a is adjusted by the engagement force adjusting means 602, whereby the switching from the sliding engagement state to the complete connection state of the clutch at the time of the mode switching can be made easy.

Although it has been explained in the above description that the clutch is the wet multi-plate clutch 6a, a single-plate clutch may also be used or a hydraulic clutch may also be used; in any case, a working effect similar to that of the wet multi-plate clutch 6a shown in FIG. 1 is obtained.

Industrial Applicability

As described above, in the hybrid vehicle according to the present invention, it is possible to select any one of a plurality of running modes suited for the running ranges thereof, that is, the first running mode in which the vehicle runs using the motor 4, the second running mode in which the vehicle runs using the motor 4 while the battery 12 is charged simultaneously, and the third running mode in which the vehicle runs using the two drive powers of the engine 2 and the motor 4, and the vehicle can run in the mode; hence, the invention can be used effectively for various kinds of vehicles, such as passenger cars and trucks.

DESCRIPTION OF REFERENCE NUMERALS AND SIGNS 1 vehicle
2 engine
3 electric generator
4 motor
501 inverter
502 inverter
6 clutch (frictional engaging means)
6a wet multi-plate clutch
602 engagement force adjusting means
8 differential gear (speed reducing device)
9 controlling means
11 transmission pathway
12 battery
13 fuel tank
14 brake sensor
15 accelerator opening sensor
16 SOC sensor (remaining capacity detecting means)
17 control unit
18 electric generator rotation speed sensor
19 motor rotation speed sensor
21 voltage sensor
22 shift position sensor
se1 vehicle speed sensor (vehicle speed detecting means for front wheels)
se2 vehicle speed sensor (vehicle speed detecting means for rear wheels)
ssf wheel speed (for front wheels)
ssr wheel speed (for rear wheels)
wf wheel (front wheel)
wr wheel (rear wheel)
A1 mode selecting means
A2 requested drive power detecting means
Eq remaining capacity
Eqn remaining capacity (present value)
Eq1 steady determination capacity (first threshold value)
Eq2 urgency determination capacity (second threshold value)
Eq3 emergency determination capacity (third threshold value)
EV first running mode (EV mode) range
J1 engine output shaft
J2 drive shaft (on the side of drive wheels)
J2' drive shaft (on the side of motor)
Ms second running mode (series hybrid mode) range
Mp third running mode (parallel hybrid mode) range
Nen rotation speed in high efficiency rotation range of engine
R1 first drive force boundary
R2 second drive force boundary
R3 third drive force boundary
Sc connection vehicle speed
Sc1 first speed
Sc2 second speed
Sc3 third speed
Sc4 fourth speed
Sc5 fifth speed
Sc0 stop speed
Sv vehicle speed
SOC battery capacity

The invention claimed is:

1. A hybrid vehicle comprising:
an engine mounted on the vehicle;
a running-use motor;
a battery for supplying electric power to the running-use motor;
an electric generator for supplying electric power to the battery;
a vehicle speed detecting unit that detects a speed of the vehicle; and
a remaining capacity detecting unit that detects a remaining capacity of the battery,
the vehicle having:
a first running mode in which the engine is stopped, and the vehicle runs by a drive of the running-use motor;
a second running mode in which the electric generator is operated by a drive of the engine, and the vehicle runs by the drive of the running-use motor; and
a third running mode in which the vehicle runs by the drive of the engine and the drive of the running-use motor,
the vehicle including,
a mode selecting unit that selects a running mode so that in a state in which the remaining capacity is equal to or larger than a predetermined first threshold value, the vehicle runs in the first running mode or in the second running mode in a case that the speed detected by the vehicle speed detecting unit is lower than a predetermined first speed, and the vehicle runs in the third running mode in a case that the detected speed is equal to or higher than the predetermined first speed,
wherein in a state in which the remaining capacity is less than the predetermined first threshold value, the mode selecting unit selects the third running mode in a case that the speed detected by the vehicle speed detecting unit is equal to or higher than a predetermined second speed that is lower than the predetermined first speed,
the mode selecting unit selects the second running mode in a case that the detected speed is lower than the predetermined second speed and is equal to or higher than a predetermined third speed that is further lower than the predetermined second speed and higher than zero (0), and
the mode selecting unit selects the first running mode or the second running mode in a case that the detected speed is lower than the predetermined third speed.

2. The hybrid vehicle according to claim 1, further comprising:
a requested drive power detecting unit that detects requested drive power required for running of the vehicle, wherein
in the state in which the remaining capacity is equal to or more than the predetermined first threshold value, the mode selecting unit, in a case that the speed detected by the vehicle speed detecting unit is lower than a predetermined fourth speed that is lower than the predetermined first speed, selects the first running mode in a range in which the detected requested drive power is equal to or less than a predetermined first drive power boundary, and the mode selecting unit, in a case that the speed detected by the vehicle speed detecting unit is equal to or higher than the predetermined fourth speed and lower than the predetermined first speed, selects the first running mode in a range in which the detected requested drive power is equal to or less than a second drive power boundary that decreases from the predetermined first drive power boundary as the vehicle speed increases, and selects the second running mode in a range in which the detected requested drive power is more than the second drive power boundary.

3. The hybrid vehicle according to claim 2, wherein in the state in which the remaining capacity is less than the predetermined first threshold value, the mode selecting unit, in the case that the speed detected by the vehicle speed detecting unit is lower than the predetermined third speed, selects the first running mode in a range in which the detected requested drive power is equal to or less than a third drive power boundary that is smaller than the first drive power boundary, and selects the second running mode in a range in which the detected requested drive power is more than the third drive power boundary.

4. The hybrid vehicle according to claim 1, wherein in a state in which the remaining capacity is further smaller than a predetermined second threshold value that is smaller than the predetermined first threshold value, the mode selecting unit selects the third running mode in a case that the speed detected by the vehicle speed detecting unit is larger than a predetermined fifth speed that is lower than the predetermined third speed, and selects the first running mode in a case that the detected speed is lower than the predetermined fifth speed.

5. The hybrid vehicle according to claim 1, wherein in a state in which the remaining capacity is further smaller than a predetermined third threshold value that is smaller than the predetermined second threshold value, the mode selecting unit selects the third running mode simultaneously with a start of the vehicle.

6. The hybrid vehicle according to claim 1, further comprising:
   a drive shaft provided with drive wheels;
   a transmission pathway for transmitting a power of the engine to the drive shaft; and
   a frictional engaging unit that disengages/engages the transmission pathway,
   wherein switching between the first running mode or the second running mode and the third running mode is performed by disengaging/engaging the transmission pathway using the frictional engaging unit.

7. The hybrid vehicle according to claim 1, wherein a drive power of the engine in the third running mode is transmitted to the drive wheels via a speed reducing device having a fixed ratio.

8. The hybrid vehicle according to claim 6, wherein when switching to the third running mode, the frictional engaging unit is partially engaged for a predetermined period of time, and then fully engaged thereafter.

* * * * *